United States Patent [19]

Monahan et al.

[11] Patent Number: 5,896,546
[45] Date of Patent: Apr. 20, 1999

[54] "STICKY" LOGICAL DRIVE LETTER ASSIGNMENTS

[75] Inventors: Mary Linda Monahan, Boca Raton, Fla.; Antonio Abbondanzio, Round Rock, Tex.

[73] Assignee: International Business Machines Corporation, Armonk, N.Y.

[21] Appl. No.: 08/742,535

[22] Filed: Nov. 1, 1996

[51] Int. Cl.$^6$ .................................................. G06F 13/22
[52] U.S. Cl. .......................... 395/830; 395/8; 395/28; 395/836; 395/837; 395/309; 395/500
[58] Field of Search ..................... 395/828–834, 395/836, 282–283, 284–285, 309, 837, 500

[56] References Cited

U.S. PATENT DOCUMENTS

| 4,396,984 | 8/1983 | Videki, II | 364/200 |
|---|---|---|---|
| 4,982,324 | 1/1991 | McConaughy et al. | 395/830 |
| 5,408,630 | 4/1995 | Moss | 395/425 |
| 5,414,850 | 5/1995 | Whiting | 395/700 |
| 5,440,693 | 8/1995 | Arnold et al. | 395/284 |
| 5,491,804 | 2/1996 | Heath et al. | 395/275 |
| 5,546,557 | 8/1996 | Allen et al. | 711/111 |
| 5,559,965 | 9/1996 | Oztaskin et al. | 395/284 |
| 5,581,786 | 12/1996 | Saito et al. | 395/828 |
| 5,598,577 | 1/1977 | Overfield | 395/830 |
| 5,640,591 | 6/1997 | Rosenthal et al. | 395/823 |
| 5,802,363 | 9/1998 | Williams et al. | 395/652 |
| 5,805,919 | 9/1998 | Anderson | 395/821 |
| 5,809,329 | 9/1998 | Lichtman et al. | 395/828 |

*Primary Examiner*—Ayaz R. Sheikh
*Assistant Examiner*—Raymond N Phan
*Attorney, Agent, or Firm*—Jeffrey S. LaBaw; Daniel E. Venglarik; Andrew J. Dillon

[57] ABSTRACT

Logical drive letters are assigned to a peripheral device in a computer using stored identifying information and a corresponding preferred drive letter assignment for each peripheral device having a preferred drive letter assignment. During system initialization, identifying information—a physical device specifier or a logical volume identification—is obtained from the peripheral device. This identifying information obtained from the peripheral device is compared to similar stored identifying information. If a match is found, the peripheral is assigned the corresponding preferred drive letter, if possible.

20 Claims, 5 Drawing Sheets

| Drive Name | Priority | Volume Label | Serial Number | Index | Drive Specifier |
|---|---|---|---|---|---|
| G: 415 | 1 | Games 416 | <Null> | 0 | <Null> |
| W: 431 | 1 433 | <Null> | <Null> | 0 | \\ISA\AHA154X_0\CDROM_(2,0) 432 |
| T: 451 | 1 | Images 452 | 23456678 | 0 | <Null> |
| R: | 1 | Tools | 54392348 | 0 | \\ISA\AHA154X_0\DISK_(0,1) |
| V: | 2 | Database | 87492348 | 0 | <Null> |
| S: 441 | 2 443 | Notes 442 | <Null> | 0 | <Null> |
| C: | FF | DOS | 48375843 | 0 | \\ISA\AHA154X_0\DISK_(0,0) |
| D: | FF | Data | 89375943 | 1 | \\ISA\AHA154X_0\DISK_(0,0) |
| E: | FF | OS/2 | 34234543 | 2 | \\ISA\AHA154X_0\DISK_(0,0) |
| F: | FF | APPS | 63904743 | 3 | \\ISA\AHA154X_0\DISK_(0,0) |

"STICKY" LOGICAL DRIVE LETTER ASSIGNMENTS

BACKGROUND OF THE INVENTION

1. Technical Field

The present invention relates in general to assigning logical drive letters to peripheral devices in data processing systems and in particular to assigning drive letters to such peripheral devices based on the user's preferences. Still more particularly, the present invention relates to mapping drive letters to a particular volume, device, or device partition and retaining the drive letter assignment for that volume, device, or device partition despite changes in the hardware topology.

2. Description of the Related Art

Several operating systems adhere to the convention of assigning drive letters to identify peripheral devices such as floppy disk drives, hard disk drives, and CDROM drives. Single drive letters, from A to Z, are utilized to permit system access to such peripherals. Generally, drive letter assignments are made during system initialization. A few peripheral devices, such as floppy drives and hard drives, may receive drive letter assignments based on settings in the system BIOS. The remaining peripheral devices receive drive letter assignments based on the next available logical drive letter.

As a result of these conventions, similar peripherals on different computers may be assigned different drive letters. For example, it is not uncommon for a 3½" floppy drive to be assigned to either drive "A:" or "B:". CDROM drives on different computers may frequently be assigned either "D:" or "E:" depending on the number of hard drives or hard drive partitions in the computer.

The conventions described above may also result in drive letter assignments in the same computer varying—intentionally or unintentionally—for a variety of reasons. For example, systems which boot multiple operating systems may end up with their drive letter assignments different in the two environments. Adding a new partition or deleting an old one on a hard drive "moves" the drive letter assignments of all following partitions or devices.

There are a number of situations where it would be desirable to consistently assign the same drive letter to a specific device. One such situation is a system which boots multiple operating systems as described above. Another involves application roll outs to large numbers of customers. The same drive letter configuration is desirable for consistency in application installation, but different hardware configurations may result in different drive letters.

Mobile computers also may have different peripherals, including different hard drives, attached at different times. It may be useful to have certain partitions or devices retain the same drive letter regardless of what other peripherals are currently attached, particularly for ergonomic reasons. For example, a user may wish a certain PCMCIA hard drive to have the same drive letter assignment, regardless of the number of other PCMCIA hard drives installed. In that situation, the user may count on a certain file always being present on, say, the "H:" drive rather than having to determine which drive letter is assigned to the PCMCIA hard drive containing that file.

Many applications are sensitive to the drive letter to which they are installed, for example by the path to data or configuration preferences files. "Moving" a drive letter assignment by adding or deleting a hard drive partition can break such applications installed on those drives. Furthermore, in the past removable media was limited primarily to floppies and CDROMs. With the advent of Plug'n Play, however, "removable" hard drives are becoming much more common.

In the past, efforts have been directed toward solving a related problem: maintaining the same drive letter for physical devices that are moved between computers. In one proposed solution, a drive control file containing device serial numbers and a drive letter associated with each device is created in the root directory of the boot device and processed during startup. However this system does not permit different partitions or volumes in the same device (e.g., CDROMs in a CDROM changer or cartridges in a Bernoulli drive) to be assigned individual drive letters and does not permit a single drive letter to have more than one assignment.

Another proposal for maintaining drive letter assignments as a device or volume is moved between computers involves marking each drive in the root directory with the assigned drive letter. This method is limited since read-only media such as CDROMs cannot be marked. Moreover, there exists a danger of different devices, assigned the same drive letter while inserted in different computers, could have conflicting assignments when installed in the same computer.

It would be desirable to be able to access specific devices, device partitions, or volumes in a given computer using the same drive letter regardless of changes in hardware topology. It would also be desirable if priorities could be set between assignment of a drive letter based on the device and assignment based on the volume. It would also be desirable to utilize the same drive letter assignment for more than one device and/or volume.

SUMMARY OF THE INVENTION

It is therefore one object of the present invention to provide a method of assigning logical drive letters to peripheral devices in data processing systems.

It is another object of the present invention to provide a method of assigning drive letters to peripheral devices based on the user's preferences.

It is yet another object of the present invention to provide a method of mapping drive letters to a particular volume, device, or device partition and retaining the drive letter assignment for that volume, device, or device partition despite changes in the hardware topology.

The foregoing objects are achieved as is now described. Logical drive letters are assigned to a peripheral device in a data processing system utilizing stored identifying information and a corresponding preferred drive letter assignment for each peripheral device having a preferred drive letter assignment. During initialization of the data processing system, identifying information—a physical device specifier or a logical volume identification—is obtained from the peripheral device. This identifying information obtained from the peripheral device is compared to similar stored identifying information. If a match is found, the peripheral is assigned the corresponding preferred drive letter, if possible.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
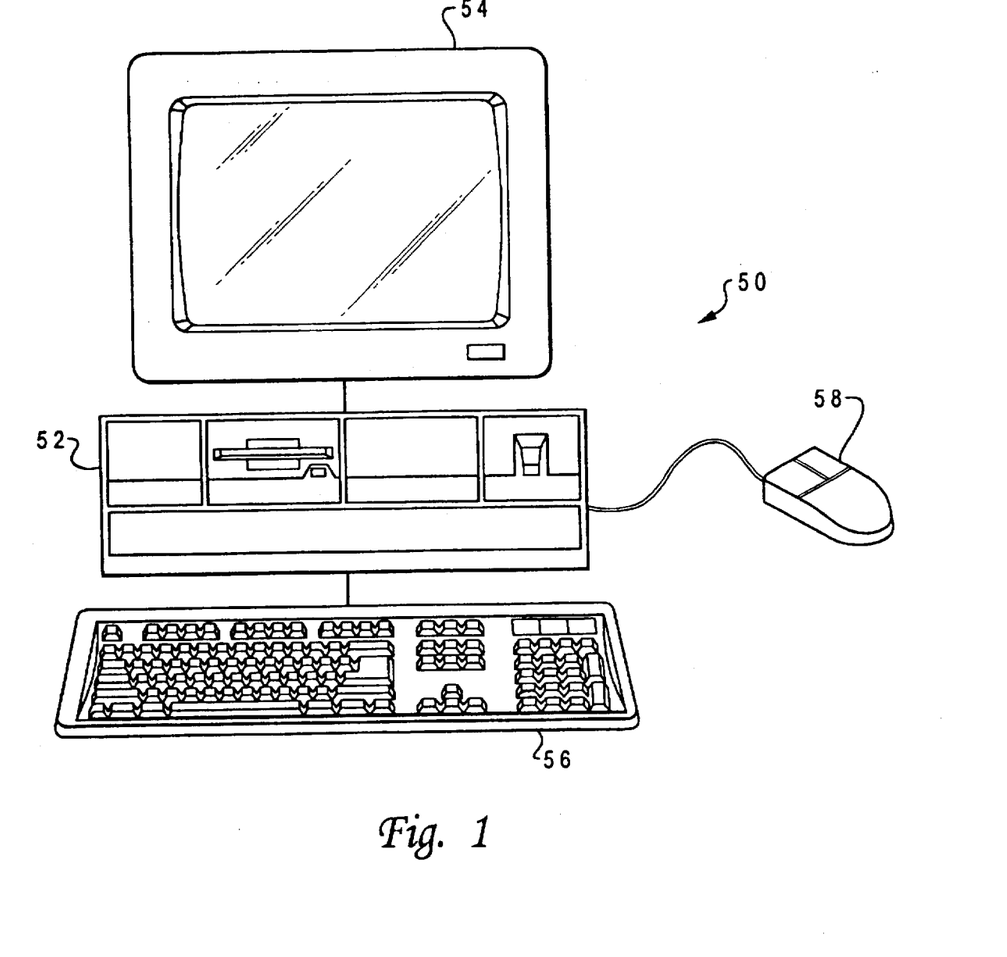
FIG. 1 is a pictorial representation of a data processing system that may be utilized to implement a method and system of a preferred embodiment of the present invention.

With reference now to the figures and in particular with reference to FIG. 1, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Personal computer 50 may be any suitable computer such as an IBM PC computer, a product of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Figure 2:
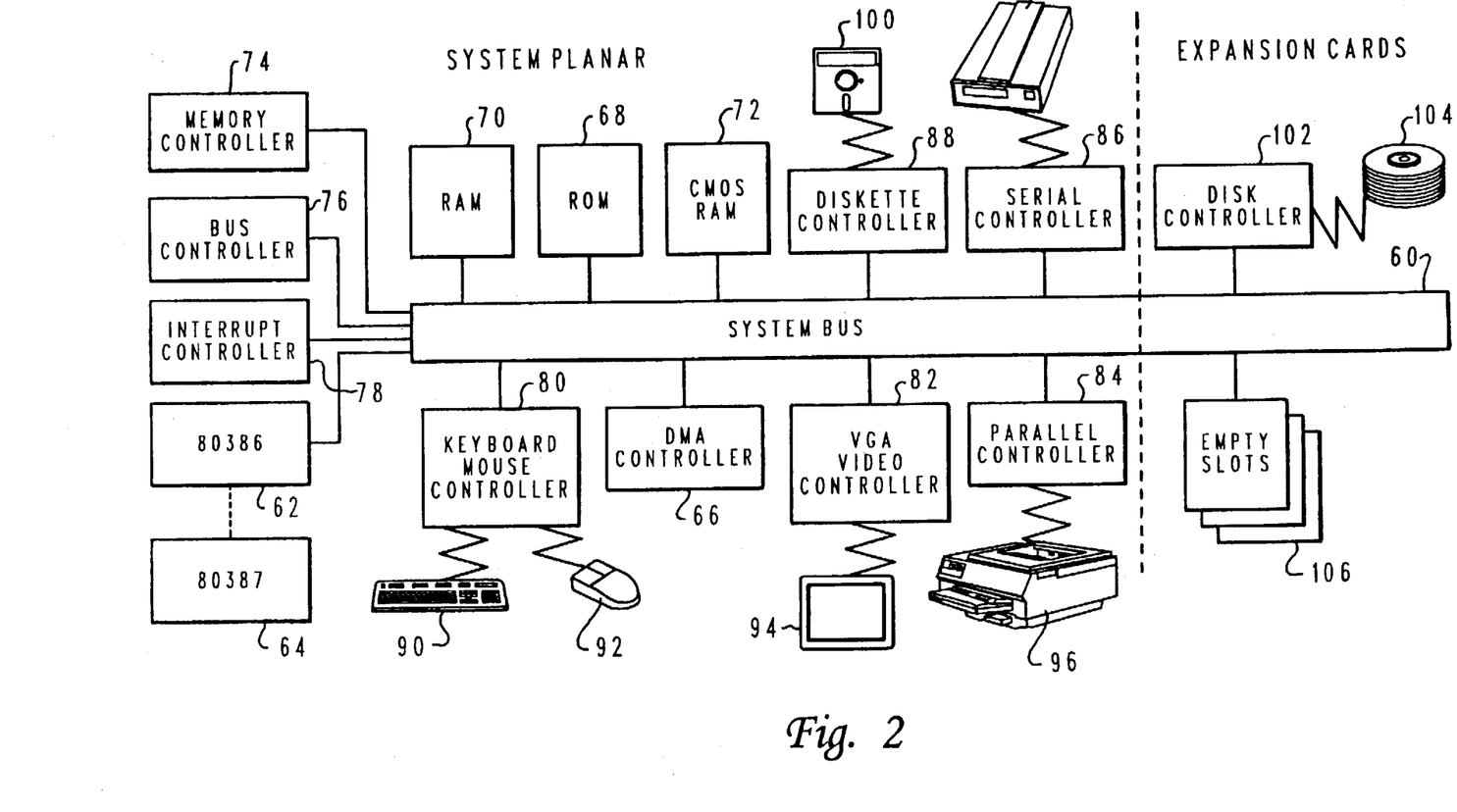
FIG. 2 depicts a block diagram of selected components in the data processing system represented in FIG. 1 in which a preferred embodiment of the present invention may be implemented.

Referring now to FIG. 2, there is depicted a block diagram of selected components in data processing system in which a preferred embodiment of the present invention may be implemented. System unit 52 preferably includes a system bus 60 for interconnecting and establishing communication between various components in system unit 52. Microprocessor 62 is connected to system bus 60, and also may be connected to numeric coprocessor 64. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific implementations. For example, other peripheral devices may be connected to system bus 60, such as a tape drive connected between parallel controller 84 and printer 96, or other devices or device adapters connected via empty slots 106.

Figure 3:
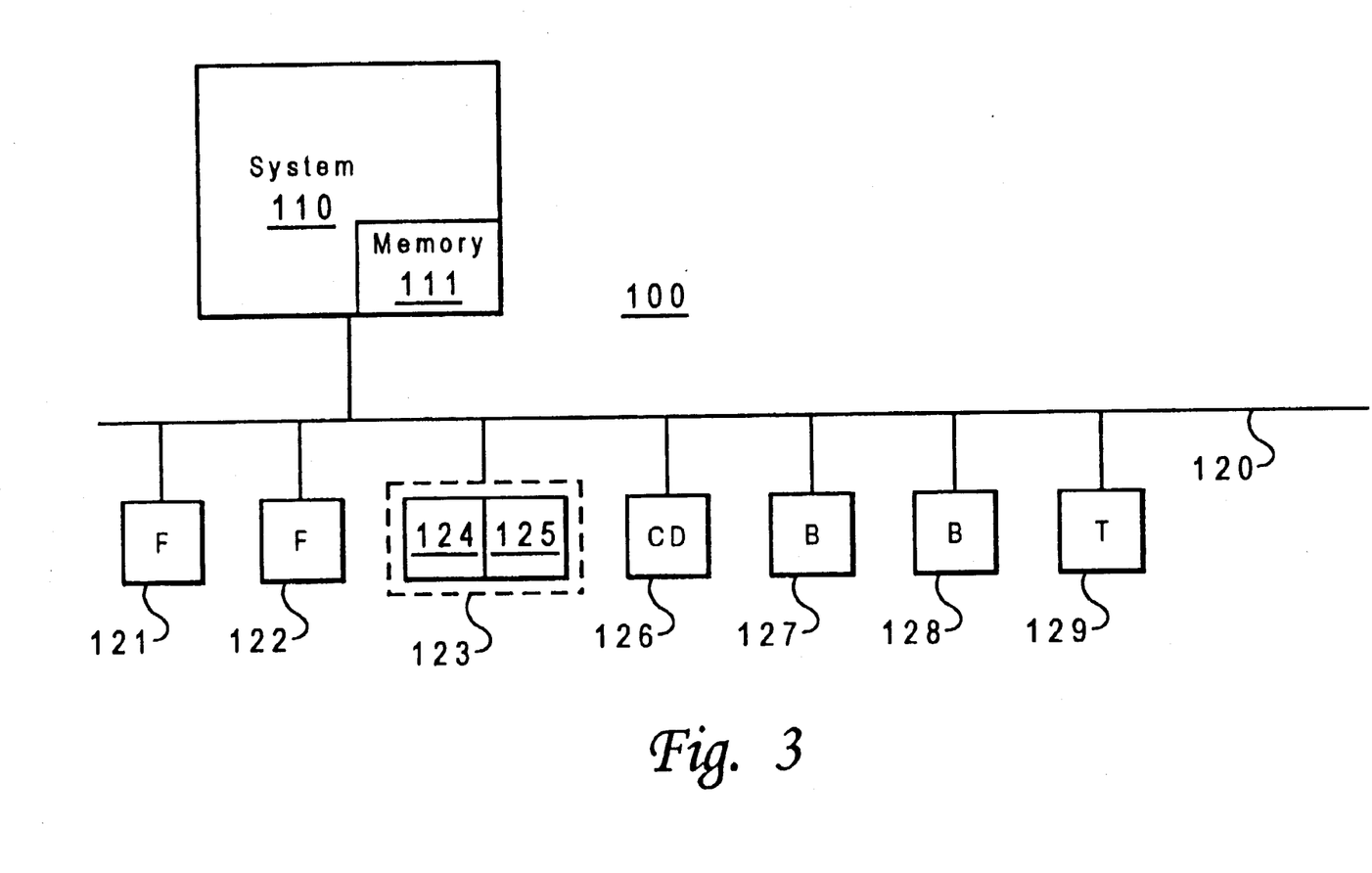
FIG. 3 is a block diagram demonstrating the variety of peripheral devices which may be contained in a data processing system in which a preferred embodiment of the present invention may be implemented.

With reference now to FIG. 3, another block diagram of selected components is depicted, demonstrating the variety of peripheral devices which may be contained in a data processing system in which a preferred embodiment of the present invention may be implemented. System block 110 of a data processing system 100 represents all components—hardware or software—of such data processing system 100 which are not specifically shown. System block 110 includes a memory 111 containing the "rules" for preferred drive letter assignments. System block 110 is connected via bus 120 to various peripheral devices, which may include a 5¼" floppy drive 121, a 3½" floppy drive 122, a hard drive 123 which includes first and second partitions 124 and 125 in the example depicted, a CDROM drive 126, first and second Bernoulli drives 127 and 128, and tape drive 129. It will be understood that those skilled in the art that data processing system 100 may have all or any combination of the above peripherals, as well as other peripherals not shown. As used herein, the term "peripheral device" refers not only to physical peripheral devices such as hard drives, floppy disk drives, or CDROM drives, but also to logical peripheral devices such as hard drive partitions, etc.

Device and volume information required for the present invention must be stored in some retrievable form. Those skilled in the art will recognize that a variety of data structures may be used to store the required information. In a preferred embodiment, however, such required information is maintained in a volume parameter block (VPB) and a drive parameter block (DPB), both of which utilize dynamically allocated blocks of memory 111. The VPB contains information about the volume, such as volume name or label and a unique volume ID. The DPB represents the device and maintains information regarding the device, such as device driver address, driver unit number, logical drive number, sector size, partition information, bios parameter block (BPB), and linkage pointers. DPBs are defined as either physical (representing the device) or logical (representing partitions on the device). Physical DPBs are created during system initialization after the device driver is loaded for the current device, or whenever a device is added to the system during operation. Logical DPBs are created for each partition, or for each media if not partitioned, and linked together and to the corresponding physical DPB in doubly linked lists. When media is changed or removed, the corresponding logical DPBs are changed or deallocated.

Figure 4:
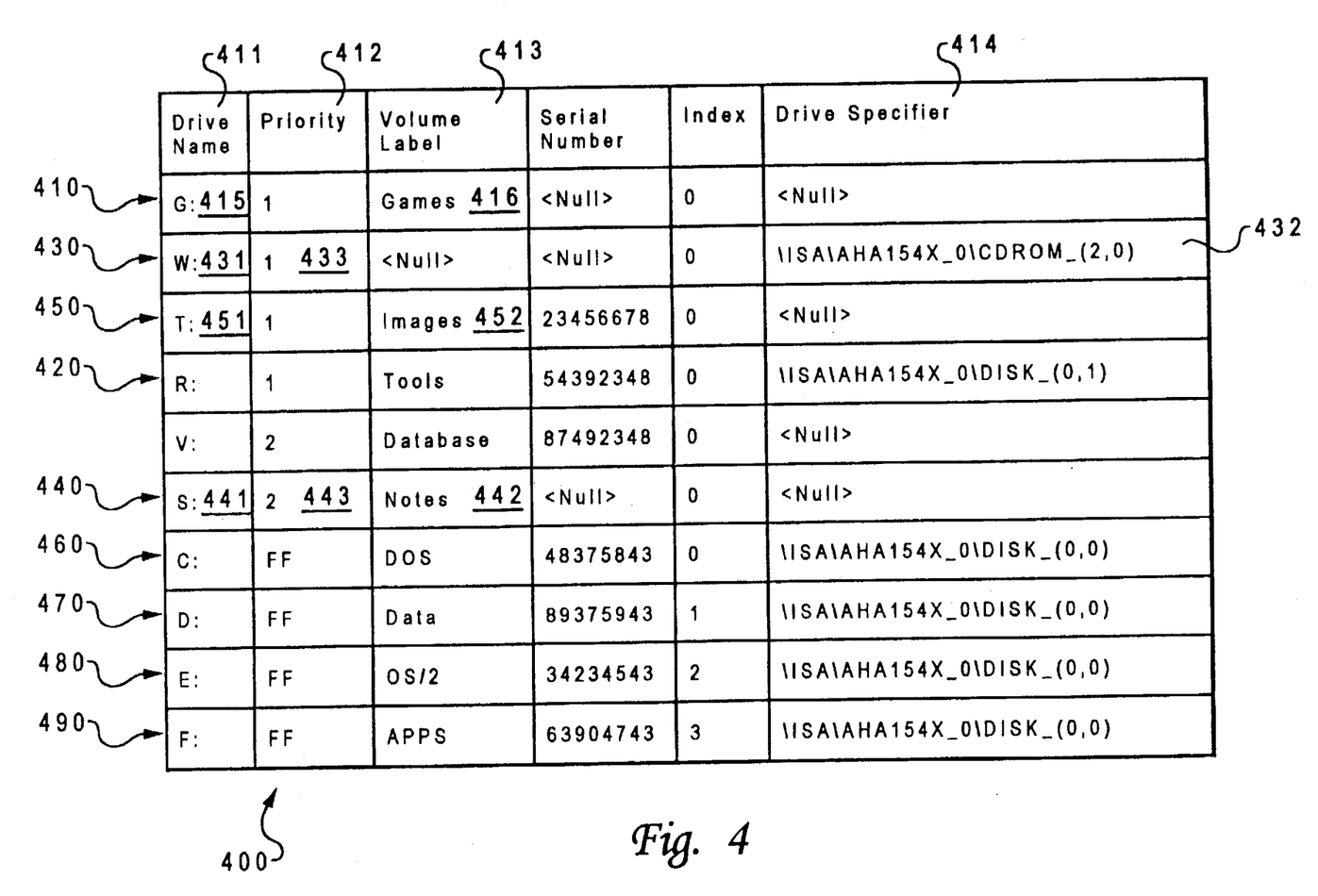
FIG. 4 depicts a portion of a table of preferred drive letter assignments in accordance with a preferred embodiment of the present invention.

Referring to FIG. 4, a set of drive name rules for a preferred embodiment of the present invention is illustrated. A linked list of drive letter assignment preferences or drive name rules 400 comprises a series of individual drive name rules containing the required persistent data. A drive name rule 410 is composed of a drive name 411 and assignment criteria. The assignment criteria include a priority 412, a logical volume identification 413, and/or a physical drive specifier 414. If both a volume identification 413 and a drive specifier 414 are present in a given drive name rule, the drive name rule is treated as an AND condition—both the volume identification and the drive specifier must be matched for the drive letter assignment preference to be applied.

Logical volume identification 413 is a unique logical identifier for the volume such as a volume label. The logical volume serial number of certain media, created during formatting by some operating systems which do not require a unique volume label for each media present, may be used as an adjunct to the volume label. In a preferred embodiment, the logical volume serial number is used as a tiebreaker when two volumes have identical volume labels (including cases where both volumes have no volume label).

Drive specifier 414 is a unique descriptor for the physical device being assigned a preferred drive letter. In a preferred embodiment, drive specifier 414 is an alias which includes a physical node path to the physical device (e.g., \ISA\AHA154X_0\CDROM_(2,0)). Use of such an alias provides more consistent mapping between the drive letter assignment preference and the actual device than use of the logical device name. Drive letter assignments tied to a specific device will remain even if another device is added to the system, changing the actual physical device which maps to the logical device name. Those skilled in the art will recognize that some other unique physical descriptor, such as the physical device serial number, may be used as a drive specifier.

An operating system component is responsible for implementing drive letter assignment preferences, both during system initialization and when new volumes are added to the system. This operating system component maintains the linked list of drive letter preferences 400 in memory and is responsible for reflecting any changes to drive letter assignment preferences back to that persistent database. The location and form of the persistent data maintained in the linked list of drive name rules 400 is not critical.

In systems which support multiple operating systems, with only one operating system supporting drive letter assignment preferences, consistency in drive letter assignments between operating systems may be maintained by implementing drive name rules 400 which correspond to the drive letter assignments made in the other operating system.

Referring still to FIG. 4, through an operating system component, the user may designate a drive letter assignment preference for a particular volume or device, which results in creation of a drive name rule 410. For "fixed" media, such as hard drives, assigning a drive letter preference to either volume identification 413 of device specifier 414 is equivalent to assigning the drive letter preference to both, as illustrated by drive name rule 420 in the depicted example. For removable media, however, the drive letter preference may be independently assigned to either the volume identification 413, as depicted in drive name rule 410, or the device specifier 414, as illustrated by drive name rule 430. For example, a user may assign the drive letter preference "G:" 415 to a particular Bernoulli cartridge with the volume name "Games" 416. Subject to priority limitations discussed below, drive letter "G:" will be utilized to access that cartridge regardless of the Bernoulli drive in which the cartridge is inserted. Similarly, a user may assign the drive letter preference "W:" 431 to the drive specifier 432 corresponding to a particular CDROM drive. Drive letter "W:" will then be utilized to access that CDROM drive regardless of the volume label of the CDROM inserted.

Priority level 412 is used to resolve conflicts occurring when removable media having a drive letter preference assigned by volume identification 413 is utilized in a device having a different drive letter preference assigned by drive specifier 414. Users are provided with two levels of priority for drive letter assignment preferences. For example, the assignment of drive letter preference "W:" 431 to the drive specifier 432 for a particular CDROM drive may be given a priority of level 1 433 by the user. The same user may have given the assignment of drive letter preference "S:" 441 to an application CDROM having the volume label "Notes" 442 a priority of level 2 443. During system initialization or when a new volume is accessed for the first time, level 1 assignments will be analyzed first and assigned the preferred drive letter if matched. Level 2 assignments are analyzed and matched second. Consequently, if "Notes" CDROM represented by drive name rule 440 were inserted in the CDROM drive represented by drive name rule 430 and accessed, the drive letter "W:" 431 would be assigned and the drive letter assignment preference "S:" 441 associated with the volume label "Notes" 442 would be ignored. Because only two different elements of identifying information—volume label and drive specifier—are utilized to assign drive letter preferences, two levels of priority should provide a sufficient level of control. If additional elements of identifying information were also utilized to assign drive letter preferences, additional levels of priority could be added. For example, CDROM changers containing multiple CDROMs in a single cartridge are growing in popularity. If the drive letter preference could be assigned using the drive specifier, the cartridge volume name, or the volume label of individual CDROMs within the cartridge, a third level of priority could be added.

Within a given priority level, there are no controls for determining which drive letter assignments would be made. Thus, in the example depicted in FIG. 4, a drive name rule 450 may assign the drive letter preference "T:" 451 to a CDROM having the volume label "Images" 452 at a priority of level 1. As noted above, the same priority level applies to drive name rule 430 containing the drive letter preference "W:" 431 for a CDROM drive. The drive letter assignment resulting from attempts to access the CDROM with volume label "Images" 452 from the CDROM drive having drive specifier 432 depends on whether the volume identification 413 or the device specifier 414 is checked first in applying drive name rules 400 to drive letter assignments. It is a matter of design choice as to which check is made first within a given priority level, and the order may be varied for different situations. For example, the drive specifier 414 may be checked first during system initialization, while the volume identification 413 is checked first when new removable media is detected during operation.

Priority also only applies to determining which assignment will occur in a volume name/device sequence number conflict, and does not cause a particular device to receive the preferred drive letter assignment over another device. If, for example, two Plug'n Play hard disk drives having the same drive letter assignment preference at the same priority level were present in a system at the same time, the particular hard disk drive which is assigned the preferred drive letter would be determined by which drive was initialized first. As a matter of design, the user could be precluded from assigning the same drive letter preference to more than one drive specifier 414 and/or more than one volume identification 413. The user could also be required, when assigning the same drive letter preference to both a volume identification 413 and drive specifier 414, to assign different levels of priority. Yet another variation might require different priority levels for identical drive letter preferences only when the volume identification 413 applied to removable media and the drive specifier 414 mapped to a device using removable media. In this manner conflicts could be avoided and the user's preferences strictly accommodated. However, the user's flexibility in assigning drive letter preferences is sacrificed, which may not be desirable. The user may prefer, for example, to assign one drive letter to all weekly or incremental backup tapes, presumably with the same priority level, regardless of the individual tape volume labels.

Drive name rules 400 may be checked by an operating system component both when the system is initialized and when new devices or media are detected. During system initialization, drives accessed for initialization will be assigned drive letters using applicable drive name rules. If no drive name rule applies to a specific device, the active primary partition and all logical partitions for that device are assigned drive letters which are free and which are not reserved by the drive name rules 400. If no free drive letters exist which are not part of a drive name rule, free drive letters which are part of drive name rule may be utilized, without regard to the corresponding priority level of the drive name rule, starting with the lowest available letter. Alternatively, use of reserved drive letters may start with the lowest letter in the lowest priority level and continued until that priority level is exhausted, then begin again with the lowest letter available in the next highest priority level. Using the lowest available letters first is only somewhat arbitrary since starting with the highest available letter could potentially cause problems in a LAN environment.

Devices and removable media added to the system after boot, such as PCMCIA devices, Bernoulli cartridges, etc., may be similarly checked against drive name rules. If the new device or removable media is replacing another device or media, the practice of starting with the lowest available letter not reserved by a drive name rule may be varied and the same drive letter freed by removal of the old device or media reused. This alternative would result in drives or media tending to have the same drive letters when inserted into the same slot or device, which is more user friendly. Thus, for example, a PCMCIA hard drive inserted in a particular slot, assigned the drive letter "J:" based on a drive name rule, may replaced by another PCMCIA hard drive. Under the above arrangement, the new PCMCIA hard drive would also be assigned the drive letter "J:", even if lower drive letters were available. If, however, another drive name rule were applicable to the new PCMCIA hard drive, that drive letter preference would be assigned to the new PCMCIA hard drive (if available).

An "implied" drive letter assignment preference is created for all devices and media present when the system is shut down. Implied drive letter assignment preferences are applied during system initialization unless they conflict with user-defined drive letter assignment preferences, in which case the user-defined preferences take precedence. Implied drive letter assignment preferences are discarded after all devices have been initialized, and are recreated in the drive name rules 400 during shutdown to reflect the hardware topology. Unless a device or media is added, removed, or changed after system shutdown, a complete and accurate topology should be reflected by the drive name rules 400 during system initialization. Drive name rules 460, 470, 480, and 490 in the example depicted in FIG. 4 illustrate implied drive name rules created during system shutdown for a hard disk drive having four logical partitions.

As noted above, all logical partitions on a given device to which no drive name rule applies are assigned drive letters starting with the lowest available letter. However, if a drive name rule applies to one or more partitions on a device, the corresponding preferred drive letter is assigned if available. It is preferable that subsequent logical partitions on the same device be assigned the next available drive letter if no drive name rule applies to those partitions. For example, suppose drive letters "A:", "B:", "C:" and "D:" are assigned. A PCMCIA hard drive having four logical partitions is inserted into a slot. If none of the partitions is assigned a drive letter preference, the partitions are assigned drive letters "E:", "F:", "G:", and "H:". If, on the other hand, the first partition has a drive letter assignment preference "G:", the partitions are assigned drive letters "G:", "H:", "I:" and "J:", respectively. This varies from (but is preferable to) the lowest-available-letter practice described above, which would assign the partitions drive letters "G:", "E:", "F:" and "H:", respectively.

Drive letter assignments in accordance with drive name rules 400 extremely early in the boot process. The drive letter assignments cannot be made until the base device drivers have identified at least the boot drive, but the assignments must be made prior to processing of any system initialization statement containing a logical path. The persistent data contained in drive name rules 400 must be read and linked together in the internal memory structure containing the information (i.e. the DPBs and VPBs). The internal memory structure should be global, and the information contained therein should be sorted by priority level. Drive letter assignments for all devices may be deferred until the first attempt to access a drive by name is made. Each physical DPB is checked, and for each physical DPB which has no corresponding logical DPBs or is removable: the partition information for the device is read and logical DPBs created for each partition; the volume information for each partition is read; and the volume and device information is processed using the drive name rules 400.

Figure 5:
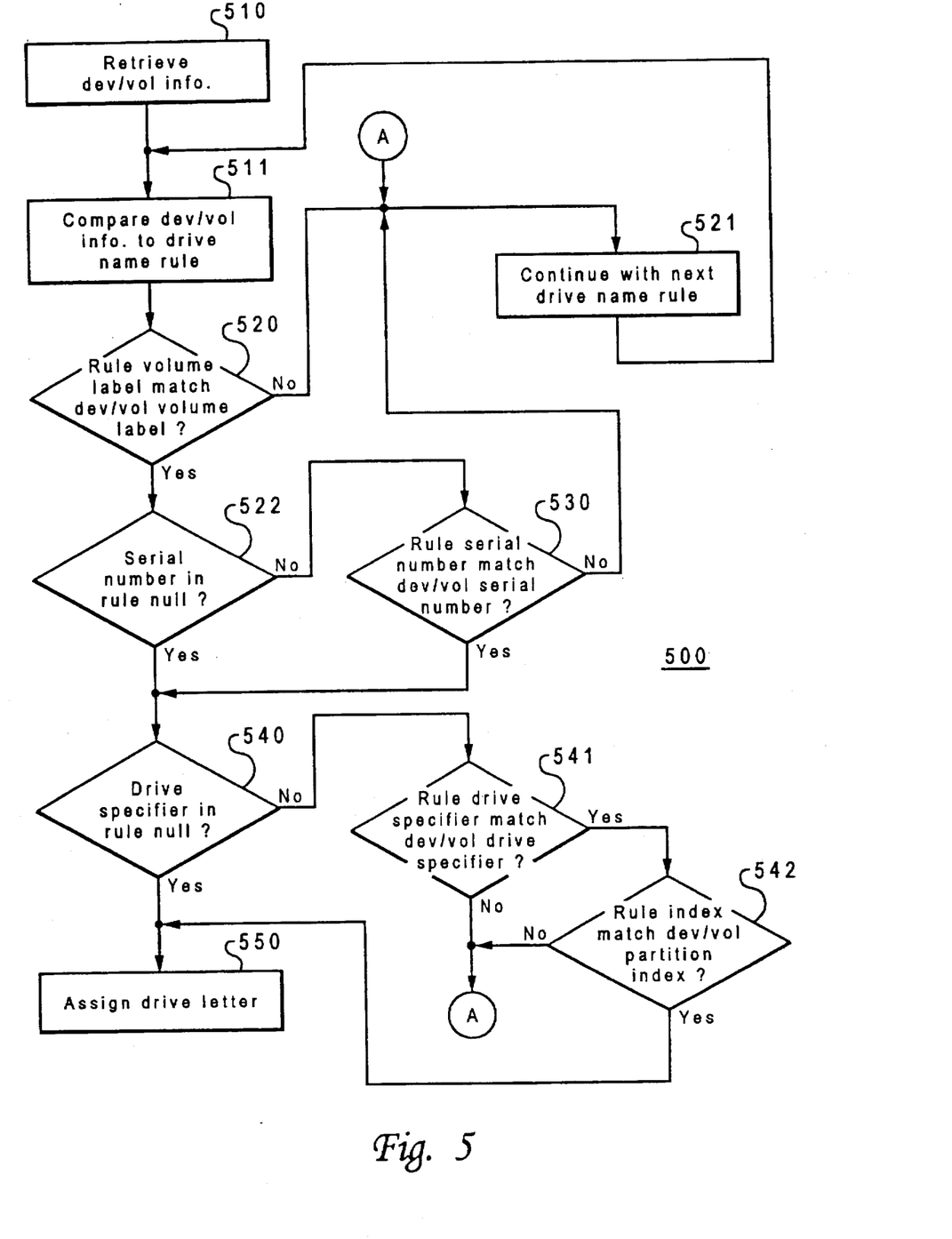
FIG. 5 is a high level logic diagram of the operation by which preferred drive letters are assigned in accordance with a preferred embodiment of the present invention.

With reference now to FIG. 5, a high level logic diagram for a process of checking and accommodating drive letter assignment preferences or drive name rules in accordance with a preferred embodiment of the present invention is depicted. The process 500 begins at step 510, which depicts retrieval of information from the device/volume (dev/vol) to be assigned a drive letter, including the volume label, the serial number, the drive specifier, and the partition index. The process then proceeds to step 520, which illustrates comparing the device/volume information to a drive name rule. The process next passes to step 520, which depicts a determination of whether the drive name rule volume label matches the device/volume volume label. If there is no match, the process proceeds to step 521, which illustrates selecting the next drive name rule, and then back to step 511.

Referring back to step 520, if the device/volume and drive name rule volume labels match, the process passes instead to step 522, which depicts a determination of whether the serial number in the drive name rule is null. If so, the process continues to step 540, which illustrates determining whether the drive specifier in the drive name rule is null; if not, the process proceeds to step 530, which depicts a comparison on the serial number in the drive name rule to the serial number of the device/volume requiring a drive letter assignment. If the serial number of the device/volume requiring a drive letter assignment is not found in the drive name rule, the process passes to step 521, which illustrates continuing the process by selecting the next drive name rule, and then back to step 511. Otherwise, the process passes to step 540, which depicts a determination of whether the drive specifier in the drive name rule is null, as described above.

If the drive specifier in the drive name rule is not found to be null in step 540, the process then passes to step 541, which illustrates a comparison of the drive specifier in the drive rule name to the drive specifier of the device/volume to be assigned a drive letter. If the drive specifiers match, the process proceeds to step 542, which depicts a comparison of the partition index in the drive name rule to the partition index of the (logical) device/volume to be assigned a drive letter.

If the indexes compared in step 542 are the same, a match to the drive rule name has been identified and the process passes to step 550, which illustrates assigning the drive letter from the drive name rule to the device/volume. If no match is found by the comparisons at steps 541 and 542, in both instances the process passes instead to step 520 and, as described above, continues with the next drive name rule back to step 511.

Once all drive name rules having the highest priority level have been examined in attempting to assign a drive letter to a specific device or volume, the drive name rules having the next lower associated priority level are checked using the process depicted in FIG. 5. If no match is found for a drive name rule at any priority level, no drive letter assignment preference applies and the next available drive letter is assigned. Once all devices have been assigned a drive letter, or the drive letter for access to new media is confirmed, the process becomes idle until an event occurs which requires further participation by the process.

In the example disclosed in FIG. 5, identifying information in the form of either a volume label or a device serial number is compared to drive name rules to determine if a drive letter assignment preference applies to the device/volume being initialized or accessed for the first time. Those skilled in the art will appreciate that the process need not be implemented as a discrete process as shown in FIG. 5, but may instead be implemented as part of a larger process for supporting peripherals, which may include additional features such as mounting volumes, locking removable media until released, and caching I/O (input/output) to the peripherals. Appropriate routines may be integrated into such peripheral support for dynamically detecting and responding to device insertion or removal and volume changes.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CDROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

We claim:

1. A method of dynamically assigning logical drive letters to peripherals in a data processing system, comprising:

storing identifying information and a corresponding preferred drive letter for each of a plurality of peripherals having a preferred drive letter assignment;

obtaining identifying information from a peripheral which said data processing system is attempting to access;

comparing identifying information obtained from said peripheral to said stored identifying information for each of said plurality of peripherals having a preferred drive letter assignment;

responsive to determining that said identifying information obtained from said peripheral matches stored identifying information for one of said plurality of peripherals having a preferred drive letter assignment, assigning said preferred drive letter corresponding to said one of said plurality of peripherals to said peripheral; and responsive to determining that said identifying information obtained from said peripheral does not match stored identifying information for any of said plurality of peripherals having a preferred drive letter assignment, assigning to said peripheral an available drive letter not matching any preferred drive letter for a peripheral having a preferred drive letter assignment, wherein said preferred drive letter assignments for said each peripheral in said data processing system is accommodated.

2. The method of claim 1, wherein said identifying information is selected from a logical volume identification or a physical device specifier for said each peripheral having a preferred drive letter assignment.

3. The method of claim 2, wherein said identifying information comprises volume labels for said each peripheral having a preferred drive letter assignment.

4. The method of claim 2, wherein said identifying information comprises drive specifiers for said each peripheral having a preferred drive letter assignment.

5. The method of claim 1, further comprising:

responsive to determining that said identifying information obtained from said peripheral does not match stored identifying information for any of said plurality of peripherals having a preferred drive letter assignment, assigning a next available drive letter to said peripheral.

6. The method of claim 1, wherein said storing step further comprises:

storing drive specifiers and associated priority levels for said each peripheral having a preferred drive letter assignment;

sorting said drive specifiers using said associated priority levels;

storing volume labels and associated priority levels for said each peripheral having a preferred drive letter assignment; and sorting said volume labels using said associated priority levels.

7. The method of claim 6, wherein said obtaining step further comprises obtaining both a drive specifier and a volume label for said peripheral.

8. The method of claim 7, wherein said comparing step further comprises:

comparing said volume label obtained from said peripheral to said stored volume labels; and comparing said drive specifier obtained from said peripheral to said stored drive specifiers.

9. The method of claim 8, wherein said comparing step further comprises:

comparing said volume label obtained from said peripheral to said stored volume labels having a first associated priority level; and comparing said drive specifier obtained from said peripheral to said stored drive specifiers having the first associated priority level.

10. A data processing system including at least one peripheral, comprising:

memory means for storing identifying information and a corresponding preferred drive letter for each of a plurality of peripherals having a preferred drive letter assignment;

first identifying means for obtaining identifying information from a peripheral which said data processing system is attempting to access;

comparing means for comparing identifying information obtained from said peripheral to said stored identifying information for each of said plurality of peripherals having a preferred drive letter assignment;

assigning means, responsive to determining that said identifying information obtained from said peripheral matches stored identifying information for one of said plurality of peripherals having a preferred drive letter assignment, for assigning said preferred drive letter corresponding to said one of said plurality of peripherals to said peripheral; and alternate assigning means, responsive to determining that said identifying information obtained from said peripheral does not match stored identifying information for any of said plurality of peripherals having a preferred drive letter assignment, for assigning to said peripheral an available drive letter not matching any preferred drive letter for a peripheral having a preferred drive letter assignment, wherein said preferred drive letter assignments for said each peripheral in said data processing system is accommodated.

11. The data processing system of claim 10, wherein said identifying information is selected from of a logical volume identification or a physical drive specifier for said each peripheral having a preferred drive letter assignment.

12. The data processing system of claim 11, wherein said identifying information comprises volume labels for said each peripheral having a preferred drive letter assignment.

13. The data processing system of claim 1 1, wherein said identifying information comprises drive specifiers for said each peripheral having a preferred drive letter assignment.

14. The data processing system of claim 10, wherein said memory means further comprises:

memory means for storing drive specifiers and associated priority levels for said each peripheral having a preferred drive letter assignment; and memory means for storing volume labels and associated priority levels for said each peripheral having a preferred drive letter assignment;

sorting means for sorting said drive specifiers and volume labels using said associated priority levels.

15. The data processing system of claim 14, wherein said first identifying means further comprises means for obtaining both a drive specifier and a volume label from said peripheral.

16. The data processing system of claim 15, wherein said comparing means further comprises:

means for comparing said volume label obtained from said peripheral to said stored volume labels; and means for comparing said drive specifier obtained from said peripheral to said stored drive specifiers.

17. A storage device readable by a data processing system and encoding executable instructions for the data processing system, comprising:

memory means for storing identifying information and a corresponding preferred drive letter for each of a plurality of peripherals having a preferred drive letter assignment;

first identifying means for obtaining identifying information from a peripheral which said data processing system is attempting to access;

comparing means for comparing identifying information obtained from said peripheral to said stored identifying information for each of said plurality of peripherals having a preferred drive letter assignment;

assigning means, responsive to determining that said identifying information obtained from said peripheral matches stored identifying information for one of said plurality of peripherals having a preferred drive letter assignment, for assigning said preferred drive letter corresponding to said one of said plurality of peripherals to said peripheral; and alternate assigning means, responsive to determining that said identifying information obtained from said peripheral does not match stored identifying information for any of said plurality of peripherals having a preferred drive letter assignment, for assigning to said peripheral an available drive letter not matching any preferred drive letter for a peripheral having a preferred drive letter assignment, wherein said preferred drive letter assignments for said each peripheral in said data processing system is accommodated.

18. The storage device of claim 17, wherein said storage device is a hard disk drive.

19. The storage device of claim 17, wherein said storage device is a ROM for use within said data processing system.

20. The storage device of claim 17, wherein said storage device is a floppy diskette.

* * * * *